United States Patent [19]

Komoto et al.

[11] Patent Number: 5,307,300

[45] Date of Patent: Apr. 26, 1994

[54] HIGH SPEED PROCESSING UNIT

[75] Inventors: Eiji Komoto; Kazuhiko Maki, both of Tokyo, Japan

[73] Assignee: Oki Electric Industry Co., Ltd., Tokyo, Japan

[21] Appl. No.: 825,976

[22] Filed: Jan. 27, 1992

[30] Foreign Application Priority Data

Jan. 30, 1991 [JP] Japan ................................ 3-010023

[51] Int. Cl.⁵ ............................................. G06F 7/38
[52] U.S. Cl. .................................................. 364/736
[58] Field of Search ........................................ 364/736

[56] References Cited

U.S. PATENT DOCUMENTS

| | | | |
|---|---|---|---|
| 4,773,006 | 9/1988 | Kinoshita et al. | 364/736 X |
| 4,922,418 | 5/1990 | Dolecek | 364/736 |
| 4,949,292 | 8/1990 | Hashino et al. | 364/736 |
| 4,967,343 | 10/1990 | Ngai et al. | 364/736 |
| 5,073,970 | 12/1991 | Aoyama et al. | 364/736 |

OTHER PUBLICATIONS

Glenford J. Myers and David L. Budde, *The 80960 Microprocessor Architecture,* pp. 195-199 of Japanese translation published by Maruzen.

*Primary Examiner*—Tan V. Mai
*Attorney, Agent, or Firm*—Edward D. Manzo; Ted K. Ringsred

[57] ABSTRACT

A processing unit has a first data bus and a second data bus that receive first and second data from, respectively, first and second registers in a register file. An arithmetic-logic unit performs arithmetic and logic operations on the first and second data to produce third data, which it places on a third data bus. A selection circuit coupled to the first and third data buses selects either the first or third data for input to a third register in the register file, and either the first or third data for input to a fourth register in the register file. The first, second, third, and fourth registers are selected by a control circuit.

10 Claims, 2 Drawing Sheets

HIGH SPEED PROCESSING UNIT

BACKGROUND OF THE INVENTION

This invention relates to a processing unit such as the integer unit of a reduced-instruction-set-computer (referred to below as a RISC processor), more particularly to a processing unit that can execute machine-language instructions comprising both an arithmetic or logic operation and a data transfer.

Statements involving both an arithmetic operation and a data transfer abound in, for example, the widely used C programming language. Two examples follow:

$$x = + + y \quad (1)$$

$$x = y + + \quad (2)$$

Example (1) includes a prefix increment operation: first the value of y is incremented, then the incremented value is assigned to x. In example (2) incrementation is a suffix operation: first the value of y is assigned to x, then y itself is incremented.

When these statements are executed by, for example, a prior-art RISC processor, the values of x and y are stored in registers. Execution of the statement requires two machine-language instructions: one to increment the register containing the value of y, and one to transfer the original or incremented value to the register containing the value of x. Each machine-language instruction executes in one clock cycle, so the entire operation takes two clock cycles.

Data transfers preceded or followed by arithmetic and logic operations like these are extremely common in computer programs. It would be desirable to have a processing unit capable of executing such transfer-and-operation combinations more rapidly: in just one clock cycle, for example.

SUMMARY OF THE INVENTION

It is accordingly an object of the present invention to execute a data transfer simultaneously with a prefix operation.

Another object of the invention is to execute a data transfer simultaneously with a suffix operation.

Yet another object of the invention is to execute two data transfers simultaneously.

The invented processing unit comprises a register file with a plurality of registers, a first data bus that receives first data from a first register in the register file, and a second data bus that receives second data from a second register in the register file. An arithmetic-logic unit performs arithmetic and logic operations on the first data and second data to produce third data. A third data bus receives the third data from the arithmetic-logic unit.

A selection means coupled to the first data bus and the third data bus selects either the first data or the third data for input to a third register in the register file, and selects either the first data or the third data for input to a fourth register in the register file. A control means selects the first, second, third, and fourth registers.

DETAILED DESCRIPTION OF THE INVENTION

An embodiment of the invention will be described with reference to the drawings. The drawings are shown for illustrative purposes; they do not restrict the scope of the invention, which should be determined solely from the appended claims.

Figure 1:
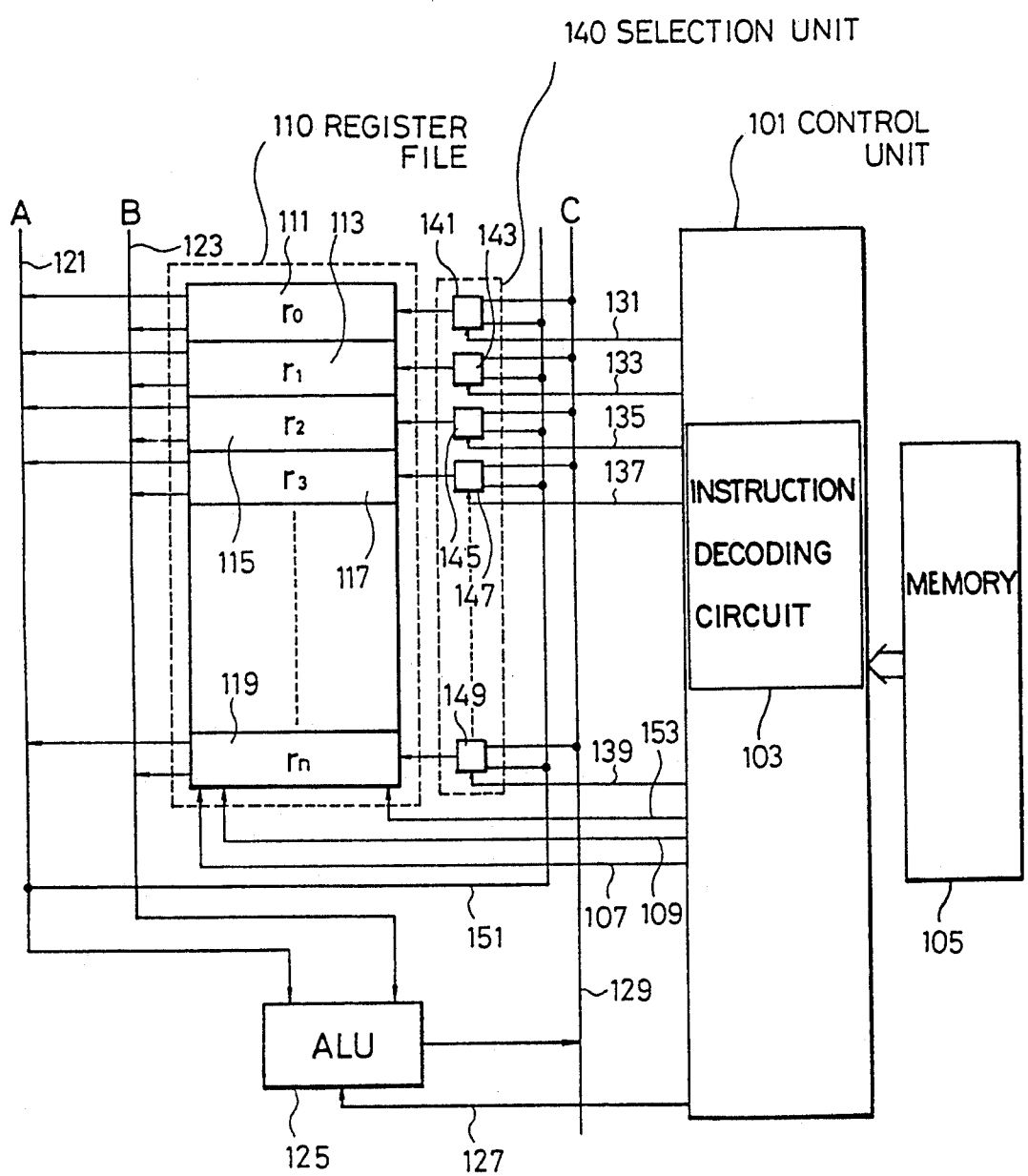
FIG. 1 is a block diagram illustrating a preferred embodiment of a processing unit according to the present invention.

Referring to FIG. 1, the processing unit has a control unit 101, part of which is an instruction decoding circuit 103. The control unit 101 reads machine-language instructions from a memory 105 and decodes each instruction to a set of control signals. Two of these control signals are register address signals carried on signal lines 107 and 109, shown for simplicity in the drawing as one line each but actually consisting of a plurality of signal lines each. Other control signals will be described later.

The processing unit also has a register file 110 comprising a plurality of registers $r_0, r_1, r_2, \ldots, r_n$, designated by reference numerals 111, 113, 115, ..., 119. Each of these registers is coupled to two buses: an A bus 121 and a B bus 123. The A bus 121 receives first data from a first source register selected by the register address on the signal line 107 and conveys the data to an arithmetic-logic unit 125. The B bus 123 receives second data from a second source register selected by the register address on the signal line 109 and conveys the data to the arithmetic-logic unit 125. The first source register and the second source register may be different registers, or they may be the same register.

In response to control signals received from the control unit 101 via a signal line 127 (shown for convenience as a single line in the drawing but actually comprising a plurality of signal lines), the arithmetic-logic unit 125 performs an arithmetic or logic operation on the first data and second data to produce third data, which it places on a C bus 129.

Corresponding to the registers 111, 113, ..., 119, the control unit 101 has signal lines 131, 133, ..., 139 that control a selection unit 140 comprising data selectors 141, 143, ..., 149. Each data selector is coupled to the C bus 129 and to an extension 151 which is part of the A bus. Responding independently to signals on the signal lines 131, 133, ..., 139, the data selectors 141, 143, ..., select either the data from the C bus 129 or the data from the A bus extension 151 and provide the selected data to the corresponding registers 111, 113, ..., 119.

The signal line 153 from the control unit 101 to the register file 110 (shown as a single line in the drawings but actually comprising a plurality of signal lines) selects two destination registers in the register file 110. Data provided from the data selectors 141, 143, ..., 149 can be written only into the two selected destination registers; the contents of other registers remain unchanged. The two destination registers may be different registers or the same register, and may be different from or the same as either of the source registers.

Figure 2:
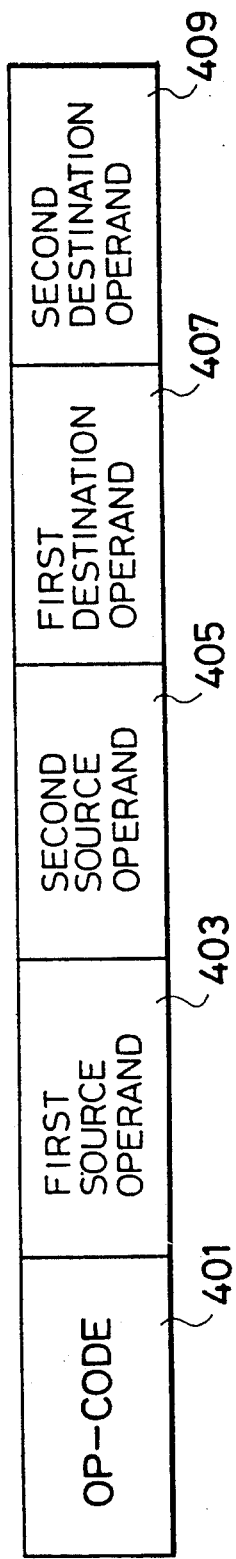
FIG. 2 is an instruction diagram illustrating the structure of a machine-language instruction executed by the processing unit of FIG. 1.

FIG. 2 shows the configuration of a machine-language instruction as stored in an instruction register in the control unit 101. The instruction comprises an opcode field 401, a first source register field 403, a second source register field 405, a first destination register field 407, and a second destination register field 409.

The first source register field 403 selects the register that is to provide data to the A bus. The second source register field 405 selects the register that is to provide data to the B bus. The first destination register field 407 selects a register that may receive data from the selection unit 140. The second destination register field 409 selects another register that may receive data from the selection unit 140. The op-code field 401 specifies an arithmetic or logic operation to be performed by the arithmetic-logic unit 125, specifies whether the registers selected by the first destination register field 407 and the second destination register field 409 are to receive data from the C bus 129 or the A bus extension 151 via the selection unit 140, and enables or disables data input to these registers.

The invention is not restricted to this particular configuration of instruction fields. For example, the fields may be arranged in a different order, or the op-code field 401 may be broken up and distributed at two or more locations in the instruction word.

Next the operation will be described by explaining how the invented processing unit executes three instructions: one performing a data transfer with a suffix operation, one performing a data transfer with prefix operation, and one performing only an arithmetic operation with no additional data transfer.

The first instruction performs, for example, the following data transfer and suffix-type addition operation:

$$r_0 \rightarrow r_2$$

$$r_0 + r_1 \rightarrow r_3$$

That is, it transfers the contents of register $r_0$ to register $r_2$, adds the contents of register $r_0$ to register $r_1$, and writes the sum in register $r_3$.

Referring to FIGS. 1 and 2, the instruction decoding circuit 103 decodes the first source register field 403 and second source register field 405 of this instruction to a pair of control signals on the signal lines 107 and 109 that cause the A bus to receive the contents of register $r_0$ 111 and the B bus to receive the contents of register $r_1$ 113. The op-code field 401 is decoded to a control signal on the signal line 127 that causes the arithmetic-logic unit 125 to add the data on the A bus to the data on the B bus and place the sum on the C bus. The op-code field 401 and the first destination register field 407 are decoded to a signal on the signal line 135 that causes the data selector 145 to select the A bus extension 151. The op-code field 401 and the second destination register field 409 are decoded to a signal on the signal line 137 that causes the data selector 147 to select the C bus 129. The op-code field 401, the first destination register field 407, and the second destination register field 409 are decoded to signals on the signal line 153 that enable input to register $r_2$ 115 and register $r_3$ 117.

Thus the contents of register $r_0$ 111 are transferred via the A bus 121, the A bus extension 151, and the data selector 145 to register $r_2$ 115. At the same time, the contents of registers $r_0$ and $r_1$ are both sent to the arithmetic-logic unit 125 which adds them together, and the sum is input via the C bus 129 and the data selector 147 to register $r_3$ 117. All these operations are completed in one clock cycle.

A prior-art processing unit with only three operands would require two clock cycles. One clock cycle would be spent transferring the contents of register $r_0$ to register $r_2$, then a second clock cycle would be needed to add the contents of registers $r_0$ and $r_1$ and place the sum in register $r_3$.

The second instruction performs, for example, the following data transfer and prefix-type addition operation:

$$r_0 + r_1 \rightarrow r_2$$

$$r_0 + r_1 \rightarrow r_3$$

That is, it adds the contents of register $r_0$ to register $r_1$, and writes the sum in both register $r_2$ and register $r_3$.

Referring to FIG. 1, this second instruction is executed in exactly the same way as the first instruction except that the signal on the signal line 135 causes the data selector 145 to select the C bus 129. The sum is thus input simultaneously to both register $r_2$ 115 and register $r_3$ 117. Neither register receives data from the A bus extension 151.

This second instruction also performs in one clock cycle an operation that would have taken two clock cycles in the prior art. In the prior art, for example, a first machine instruction would assign the sum of $r_0$ and $r_1$ to $r_2$, then a second machine instruction would copy the contents of $r_2$ to $r_3$.

The third instruction performs, for example, only the following addition operation:

$$r_0 + r_1 \rightarrow r_2$$

That is, it adds the contents of register $r_0$ to register $r_1$, and writes the sum only in register $r_2$.

Referring to FIG. 1, this third instruction is executed like the second instruction except that the signal line 153 carries a signal enabling input only to register $r_2$ 115. The data selector 135 selects the C bus 129. Thus the sum $r_1 + r_2$ is written in register $r_2$ 115, but nothing is written in any other register. This third instruction is similar to instructions executed in the prior art.

Since this third instruction has only a single destination register, the address of register $r_2$ may be placed in both the first and second destination register fields 407 and 409 in FIG. 2. Alternatively, one of the two destination register fields 407 and 409 may be ignored, or used for another purpose.

In the preceding three examples the arithmetic-logic unit 125 performed an addition operation, but other arithmetic and logic operations are of course possible. The prefix and suffix incrementing operations (1) and (2) discussed in the background of the invention, for example, can be performed by having the arithmetic-logic unit 125 ignore the data on the A bus 121, increment the data on the B bus 123, and place the incremented value on the C bus 129. In this case the second source register and second destination register are the same register.

Another useful operation can be performed by having the arithmetic-logic unit 125 simply transfer the contents of the B bus 123 to the C bus 129. If this operation is performed as a prefix operation, two data transfers are accomplished simultaneously: the contents of the first source register are transferred via the A bus 121 and the A bus extension 151 to the first destination register, while the contents of the second source register are transferred via the B bus 123, the arithmetic-logic unit 125, and the C bus 129 to the second destination register. If this operation is performed as a suffix operation, the contents of a single source register can be simultaneously transferred to two destination registers.

The ability of the invented processing unit to carry out both an arithmetic or logic operation and a data transfer at once, or to carry out two data transfers at once, leads to significant gains in software execution speed. Programs coded in high-level languages such as C language can be compiled into machine-language programs that run considerably faster than in the prior art.

Applications of this invention are not limited to the integer unit of a RISC processor, and no restriction is placed on the number of registers in the register file in FIG. 1, the bit length of the registers, the types of operations performed by the arithmetic-logic unit, or the length of the instruction word in FIG. 2.

What is claimed is:

1. A processing unit comprising:
    a register file having a plurality of registers for storing data;
    a first data bus coupled to each of said registers for receiving first data from any one of said registers which has been selected as a first source register;
    a second data bus coupled to each of said registers for receiving second data from any one of said registers which has been selected as a second source register;
    an arithmetic-logic unit coupled to receive said first and second data from said first and second data buses and to perform arithmetic and logic operations thereon to produce third data;
    a third data bus coupled to receive said third data from said arithmetic-logic unit;
    a selection circuit coupled to the register file and to said first and third buses;
    a control circuit controllingly coupled to said register file, said arithmetic-logic unit, and said selection circuit for selecting first and second ones of said registers as said first and second source registers to supply data to said first and second buses, and for selecting a third one of said registers as a first destination register for receiving data via said selection circuit;
    said selection circuit being responsively coupled to said control circuit for selecting one of said first bus and said third bus to couple data to said first destination register;
    wherein said control circuit also selects a fourth one of said registers as a second destination register for receiving data via said selection circuit; and
    said selection circuit also selects either said first bus or said third bus to couple data to said second destination register.

2. The processing unit of claim 1 further comprising a connection circuit between said control unit and said register file, by which said control unit selects said first and second destination registers.

3. The processing unit of claim 1 wherein said selection circuit selects said first bus to couple data to said first destination register, and said third bus to couple data to said second destination register.

4. A processing unit comprising:
    a register file having first to n-th registers for storing data;
    a first data bus coupled to each of said registers for receiving first data from an i-th register which has been selected among said registers as a first source register;
    a second data bus coupled to each of said registers for receiving second data from a j-th register which has been selected among said registers as a second source register;
    an arithmetic-logic unit coupled to receive said first and second data from said first and second data buses and to perform arithmetic and logic operations thereon to produce third data;
    a third data bus coupled to receive said third data from said arithmetic-logic unit;
    a selection circuit coupled to the register file and to said first and third buses; and
    a control circuit controllingly coupled to said register file, said arithmetic-logic unit, and said selection circuit for selecting said i-th and j-th registers as said first and second source registers to supply data to said first and second buses, and for selecting a k-th register among said registers as a first destination register for receiving data via said selection circuit;
    said selection circuit being responsively coupled to said control circuit for selecting one of said first bus and said third bus to couple data to said first destination register;
    wherein i, j, k and n are natural numbers; i, j, k are not greater than n.

5. The processing unit of claim 4 wherein:
    said control circuit also selects an m-th register among said registers as a second destination register for receiving data via said selection circuit; and
    said selection circuit also selects either said first bus or said third bus to couple data to said second destination register;
    wherein m is a natural number not greater than n.

6. The processing unit of claim 5, wherein said selection circuit selects said first bus to couple data to said first destination register, and selects said third bus to couple data to said second destination register; wherein k and m are not equal to each other.

7. The processing unit of claim 5 further comprising a connection circuit between said control unit and said register file, by which said control unit selects said first and second destination registers.

8. The processing unit of claim 4 wherein said selection unit comprises a plurality of selection devices each corresponding and coupled to a respective one of said plurality of registers.

9. The processing unit of claim 8 wherein each of said selection devices is coupled via a respective line to said control unit.

10. The processing unit of claim 1 wherein said control unit includes an instruction decoder circuit.

* * * * *